United States Patent
Davis

(10) Patent No.: US 8,220,558 B2
(45) Date of Patent: Jul. 17, 2012

(54) TINE ASSEMBLY AND ROLLER ASSEMBLY FOR TURF GRADER

(75) Inventor: Michael E. Davis, Indianapolis, IN (US)

(73) Assignee: GreensGroomer WorldWide, Inc., Indianapolis, IN (US)

(*) Notice: Subject to any disclaimer, the term of this patent is extended or adjusted under 35 U.S.C. 154(b) by 135 days.

(21) Appl. No.: 12/862,261

(22) Filed: Aug. 24, 2010

(65) Prior Publication Data

US 2012/0048579 A1 Mar. 1, 2012

(51) Int. Cl.
*A01B 49/02* (2006.01)
(52) U.S. Cl. ...................................................... 172/149
(58) Field of Classification Search .................. 111/130, 111/149, 186, 121, 123; 172/149, 196, 197, 172/445.1, 169, 501, 548, 799.5, 146, 170, 172/710; 209/421, 616, 625, 632
See application file for complete search history.

(56) References Cited

U.S. PATENT DOCUMENTS

| | | | |
|---|---|---|---|
| 3,448,814 A | 6/1969 | Bentley et al. | |
| 3,586,111 A | 6/1971 | Jackson | |
| 3,826,209 A | 7/1974 | Jackson | |
| 4,436,040 A * | 3/1984 | Chumley | 111/130 |
| 4,836,295 A * | 6/1989 | Estes | 172/146 |
| 5,492,182 A * | 2/1996 | Delaurier | 172/615 |
| 5,833,011 A * | 11/1998 | Boertlein | 172/149 |
| 6,119,792 A * | 9/2000 | Almer | 172/799.5 |
| 7,156,236 B2 * | 1/2007 | Geraghty | 209/421 |

OTHER PUBLICATIONS

5-N-1 Box Scraper (brochure), Central Tool Company, Inc., 461 E. Michigan Street, Fortville, IN 46040 (all pages).

* cited by examiner

*Primary Examiner* — Robert Pezzuto
(74) *Attorney, Agent, or Firm* — Woodard Emhardt Moriarty McNett & Henry LLP

(57) ABSTRACT

A turf grader including plow blades, soil engaging tines, scraper blades and a leveling and pulverizing roller. The roller includes an inner cylindrical main body with a continuous solid outwardly facing surface over which is mounted a perforated wall. The tines are arranged in pairs with each pair having a downwardly extending legs integrally joined together by a pair of coils, in turn, integrally connected together and mounted to the tine assembly sub-frame.

14 Claims, 9 Drawing Sheets

TINE ASSEMBLY AND ROLLER ASSEMBLY FOR TURF GRADER

BACKGROUND OF THE INVENTION

1. Field of the Invention

The present invention relates generally to the field of landscaping apparatus.

2. Description of the Prior Art

A variety of turf graders are used in landscaping. One such grader is shown in the U.S. Pat. Nos. 3,448,814; 3,586,111; and 3,826,209. The grader disclosed in these patents is pulled or pushed across ground with the grader having a series of plows for scarifying the ground followed by a plurality of rake teeth or tines that pick up and remove trash and debris from the plowed ground. Scraper blades extend across the width of the grader to level the plowed dirt with the blades then being followed by a heavy roller rotatably mounted to the grader.

Several improvements in the prior grader are disclosed herein. Prior graders use single tines that extend downwardly from a spring mount mounted to the grader frame. The tines spring backward as they engage the ground and debris and then forward lifting the debris apart from the ground. Disclosed herein are tines that provide superior raking and debris removal by arranging the tines in pairs with two tines integrally connected together by separate springs mounted to the grader. Since the tines are arranged in pairs, the tines may be mounted or removed from the grader quicker and easier as compared to the separate mounting required for the individual tines in the prior graders.

The prior individual tines are mounted to a tine bar which has outwardly projecting and movable pins at the ends of the bar and connected together by a line. The line may be pulled to retract the pins so that the pins may be aligned and released into apertures in the turf grader main frame thereby locking the tine bar and tines in place. The pins may be difficult to simultaneously retract with the line. The grader disclosed herein has a tine bar that may be pivoted to the correct position with a single pin then being moved from outward of the grader frame through an aperture and then into one arm of the tine bar. The same process is then repeated on the opposite side of the tine assembly.

A further improvement relates to the construction of the pulverizing and leveling roller mounted to one end of the grader. In a grader manufactured by Central Tool Company, Inc. of Fortville, Ind., the roller includes a perforated cylindrical wall that extends around a plurality of discs that are spaced along the longitudinal axis of the roller and arranged perpendicularly with respect to the perforated wall. The perforated wall is designed to pulverize clumps of dirt with the dirt extending through the perforations in the roller. Frequently, a large rock or other rigid item may be contacted by the roller resulting in damage to the perforated wall. Disclosed herein is a solid cylindrical wall positioned inwardly of and concentric with an outer mesh screen or perforated wall providing backup to the outer wall and preventing the outer wall from moving inwardly when contacted by an external object. Further, the solid cylindrical inner wall provides a stop surface limiting the flow of dirt into the roller.

The prior turf graders include scraper blades that extend across the width of the grader to contact and level the dirt once the dirt is plowed and the debris is removed. Depending upon the application, it may be desired to disable the scraper blade particularly during transportation thereof. The grader disclosed herein therefore has a scraper blade that may be pivoted to an upward position with a fastener used to secure the scraper blade in the disabled position.

SUMMARY OF THE INVENTION

One embodiment of the present invention is a turf grader that comprises a plurality of plow blades to plow the ground. A main frame has the plow blades mounted thereto which extend downwardly. The main frame has a vehicle receiving mount for attachment to move the main frame across the ground. A first scraper blade assembly has a first scraper blade that is pivotally mounted on the frame having a first position to scrape the ground as the main frame is moved across the ground and a second position located apart from the ground. A tine assembly is movably mounted to the frame and is located between the plow blades and the scraper blade to catch debris from the ground plowed by the plow blades. The tine assembly has tines integrally connected together in separate pairs with the pairs each having springs integrally connecting the tines of each pair together. The springs normally bias tines toward the ground but are yieldable to allow the pair of tines to move upwardly therefrom. A roller is mounted to the main frame and has an inner, back-up cylinder mounted within an outer perforated cylinder.

An object of the present invention is to provide a new and improved turf grader.

A further object of the present invention is to provide a turf grader having an improved tine assembly.

Yet another object of the present invention is to provide a turf grader having a new and improved pulverizing and leveling roller.

An additional object of the present invention is to provide a turf grader having a new and improved scraper blade assembly.

Related objects and advantages of the present invention will be apparent from the following description.

DESCRIPTION OF THE PREFERRED EMBODIMENT

Figure 1:
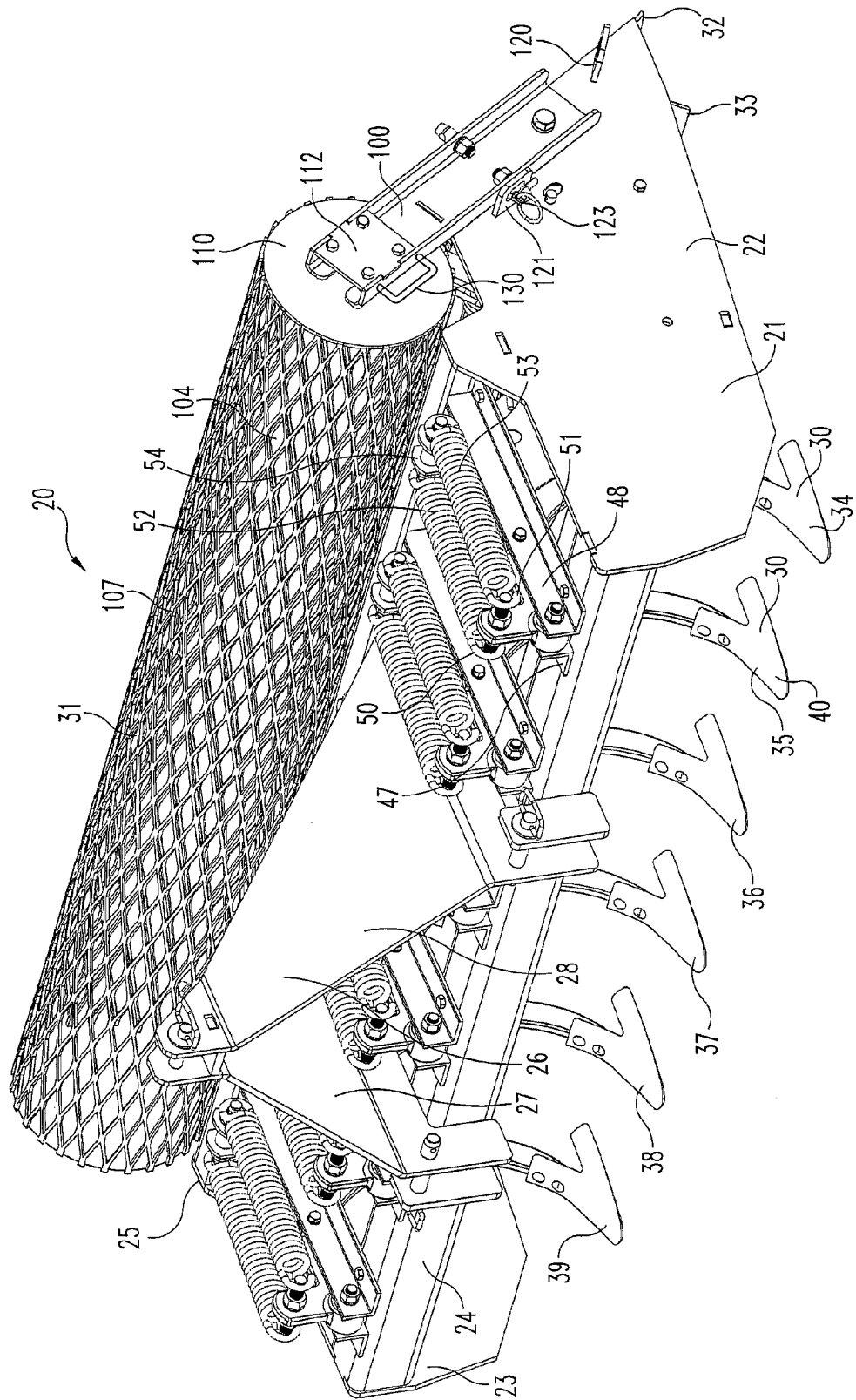
FIG. 1 is a top perspective view of the turf grader incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Turf grader 20 (FIGS. 1 and 2) includes a main frame 21 with two side walls 22 and 23 joined together by a plurality of cross members 24 and 25. An upstanding bracket 26 includes downwardly extending walls 27 and 28 having bottom ends affixed to main frame 21 and terminating at their upper ends forming a hitch 29 to attach to a powered vehicle for pulling or pushing the grader across the ground. Turf grader 20 includes five separate types of ground engaging tools.

Figure 2:
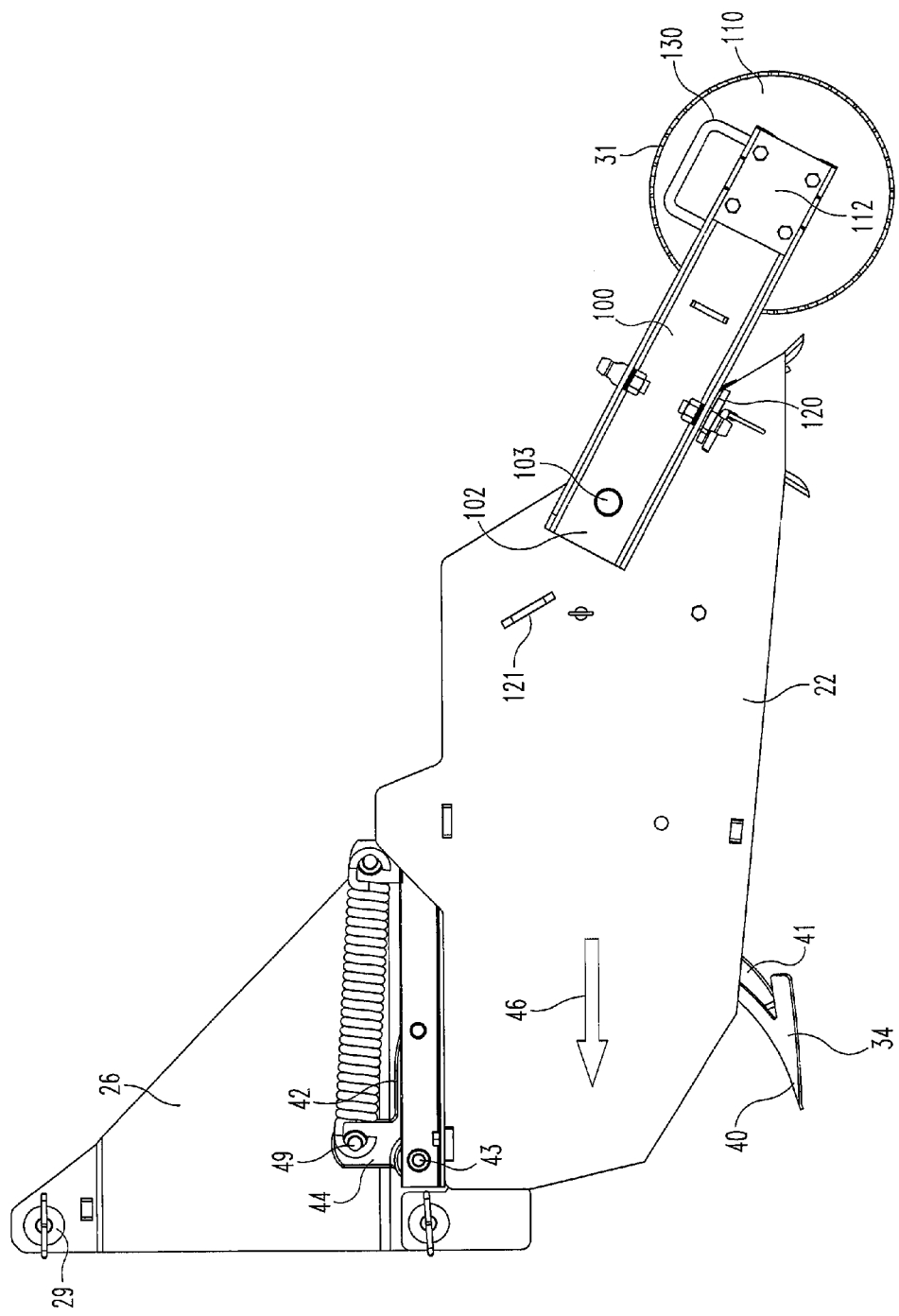
FIG. 2 is a right side view of FIG. 1 with the roller in the downward engaged position.
Figure 3:
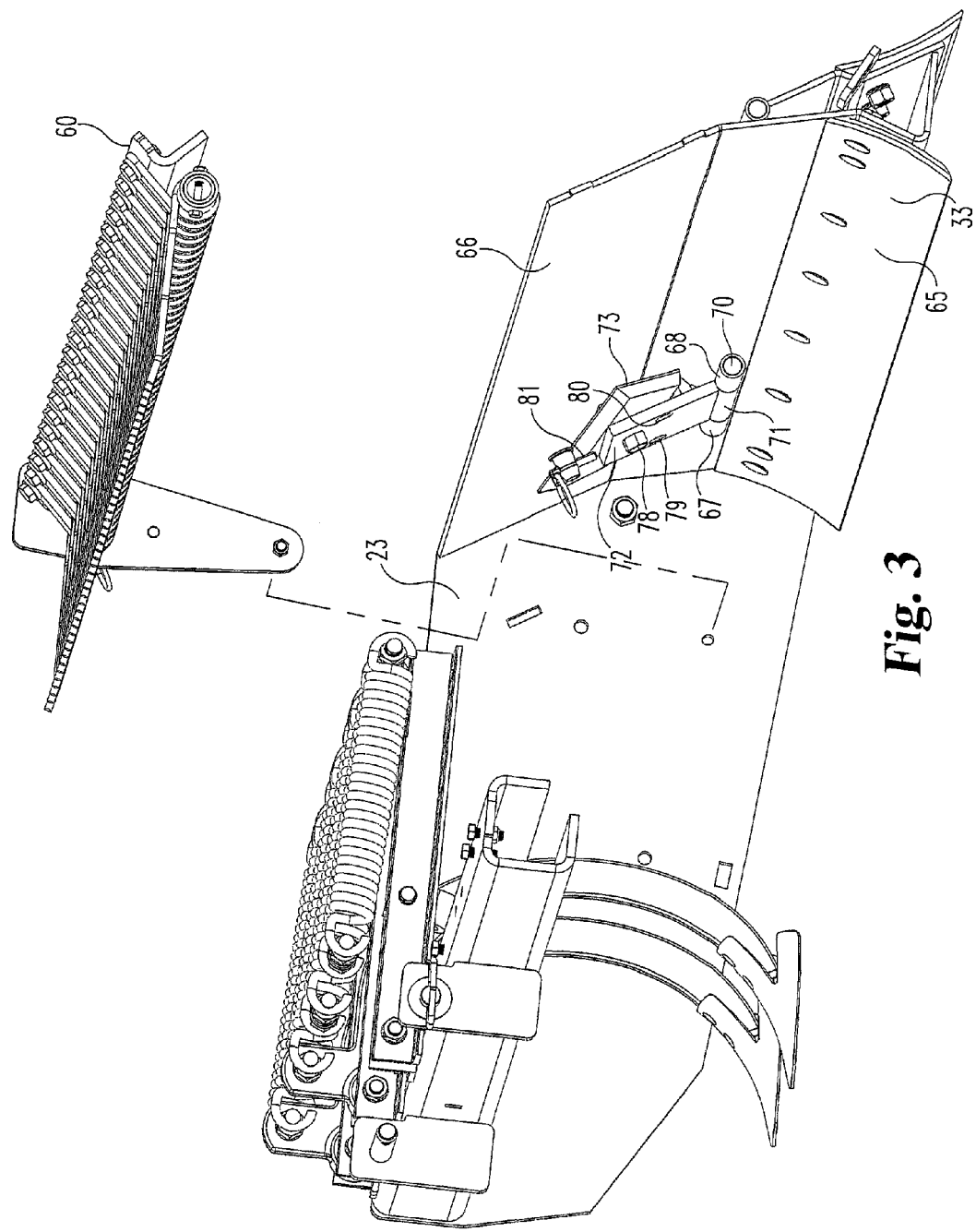
FIG. 3 is a fragmentary, exploded and perspective view of the turf grader of FIG. 1.

At one end of main frame 21 are mounted a plurality of plow blades 30 whereas at the opposite end of the main frame is mounted a leveling and pulverizing roller 31 shown in the upward or stored position in FIG. 1 and the downward and ground engaging position shown in FIG. 2. Plow blades 30 are spring biased and extend into the ground to loosen the soil to approximately 5 inches in depth. Roller 31 when in the downward locked position (FIG. 2) or when simply being in a downward but unlocked floating position pulverizes large and small groups of soil which also results in leveling of the soil. A pair of scraper blade assemblies 32 and 33 are mounted to main frame 21 and serve to shape or level the soil. Scraper blade assembly 32 is mounted at one end of frame 21 whereas scraper blade assembly 33 is mounted to the main frame between scraper blade assembly 32 and plow blades 30. A tine assembly 60 (FIGS. 3 & 4) is pivotally mounted between plow blades 30 and scraper blade assembly 33. Tine assembly 34 includes a plurality of downwardly extending tines operable to engage and rake the soil and catch debris atop and within the soil. The five soil engaging tools include plow blades 30, tine assembly 60, scraper blade assembly 33, scraper blade assembly 32, and roller 31.

Five plow blades 34-39 are shown in the preferred embodiment of FIG. 1; however, it is to be understood that more than or less than five such plow blades are included in a turf grader incorporating the present invention. Plow blade 34 (FIG. 2) will now be described it being understood that an identical description applies to plow blades 35-39. The bottom end 40 of blade 39 is pointed and is operable to pierce the soil as the turf grader is moved in the direction of arrow 46. Blade 39 includes an upwardly extending arm 41 with an offset top end 42 pivotally mounted by pin 43 extending between and mounted to a pair of right angle brackets 47 and 48 (FIG. 1), in turn, respectively having their opposite ends fixedly mounted to cross members 24 and 25. End 42 (FIG. 2) has an upwardly extending arm 44 with fastener 49 extending therethrough, in turn, respectively engaging the adjacent ends 50 and 51 (FIG. 1) of a pair of helical springs 52 and 53. The opposite ends of springs 52 and 53 are mounted by a conventional fastener to bracket 54 mounted to cross member 25.

As the turf grader is moved in the direction of arrow 46, the bottom end 40 of blade 34 engages the soil with the natural movement of the turf grader causing the blade bottom end to move in a direction opposite of arrow 46 thereby pivoting top end 42 of the blade in a counter clockwise direction as viewed in FIG. 2, in turn, causing extension of springs 52 and 53. Eventually, the two springs will pull the top end of the blade in a clockwise direction to return the bottom end of the blade in its normal forward position. In other words, springs 52 and 53 are normally operable to position the tip of blade bottom end 40 in a forward position but are yieldable under extension of the springs to cause the bottom end of the blade to move in a direction opposite of arrow 46.

Figure 7:
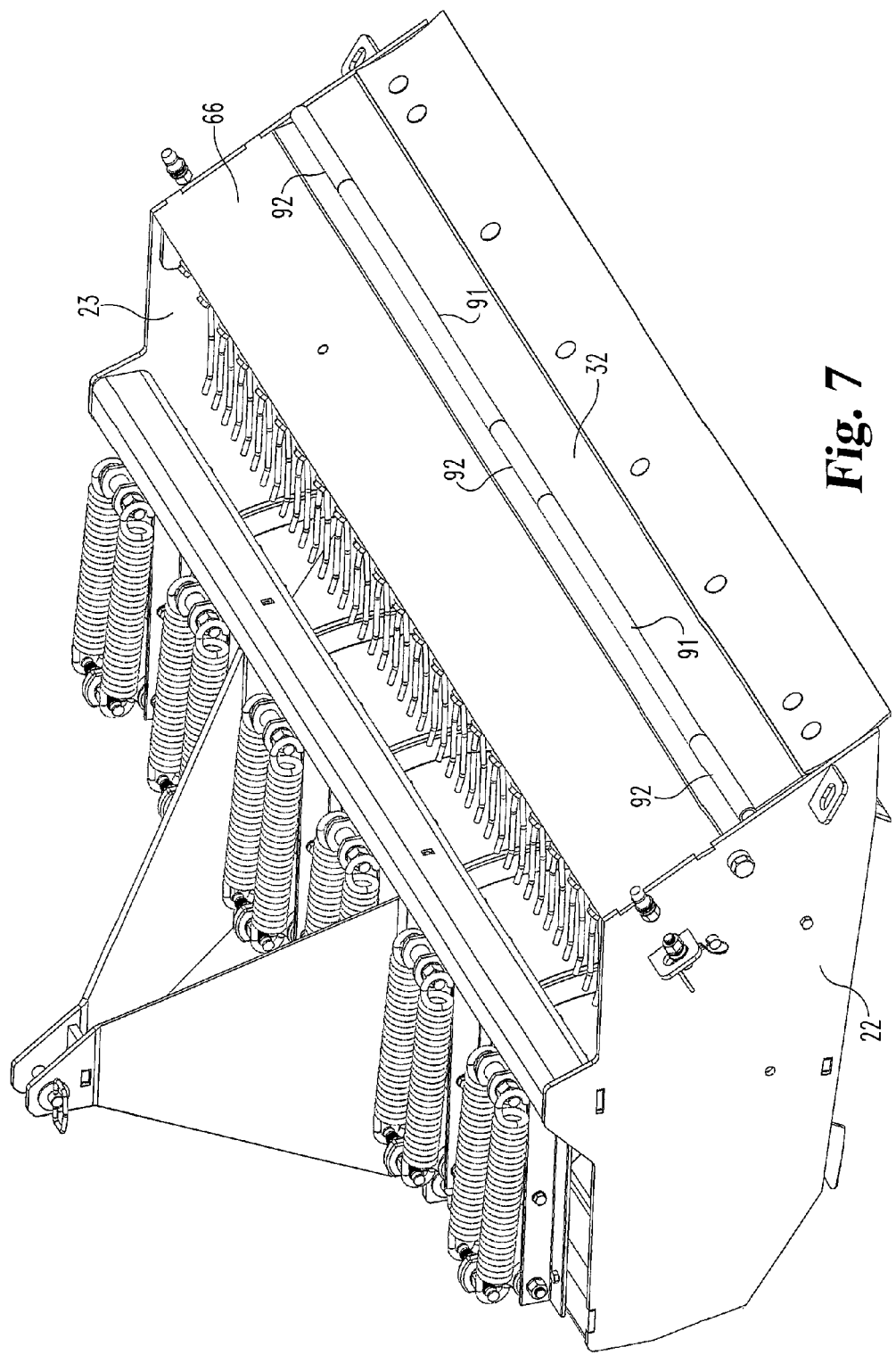
FIG. 7 is a rear perspective view of the turf grader with the roller removed to show the scraper blade.

Wall 66 (FIG. 7) extends across the width of the turf grader having its opposite ends fixedly secured to side walls 22 and 23. Blade 65 (FIG. 3) is fixedly mounted to the bottom edge portion of wall 66 and extends across the width of the turf grader and extends there beneath to engage and level the soil as the turf grader is moved there across. An edger or blade assembly 72 has a tube shaped end 71 pivotally mounted to a pair of tubes 67 and 68 fixedly secured to wall 66. Pin 70 extends through tube 67 and 68 and through the tube shaped end 70 thereby allowing the blade assembly 72 to pivot from a downward position whereat edger blade 73 engages the soil to a top position (FIG. 3) when the edger blade is no longer being utilized. Assembly 72 has a pair of spaced apart legs between which is located edger blade 73 and is secured thereto by a conventional fastener 78 extending through both legs of assembly 72 and edger blade 73. Edger blade 73 has a trapezoid shape with the greatest width of the blade being located along its bottom edge. A pair of holes 79 and 80 extend through the legs and are spaced on either side of fastener 78. By extending a fastener or pin through either hole 79 or 80, edger blade 78 is positioned in a cocked position in order to create a notch in the soil as the blade is passed over the soil. In other words, one corner of the bottom edge of blade 73 contacts the soil to create the notch. A removable pin 81 is mounted to wall 66 and is positionable against blade 73 to hold the blade in the upper stored position.

Scraper assembly 32 (FIG. 7) extends across the width of the turf grader and includes a top portion having a plurality of tubes 92 fixedly mounted thereto. Wall 66 includes tubes 91 fixedly mounted thereto by welding or other suitable means and is aligned with and located between tubes 92 of scraper blade assembly 32. A blade extends along the bottom of assembly 32. A pin extends through tubes 91 and 92 thereby allowing the scraper blade assembly to pivot from the downward position when contacting the soil to an upward stored position.

Figure 8:
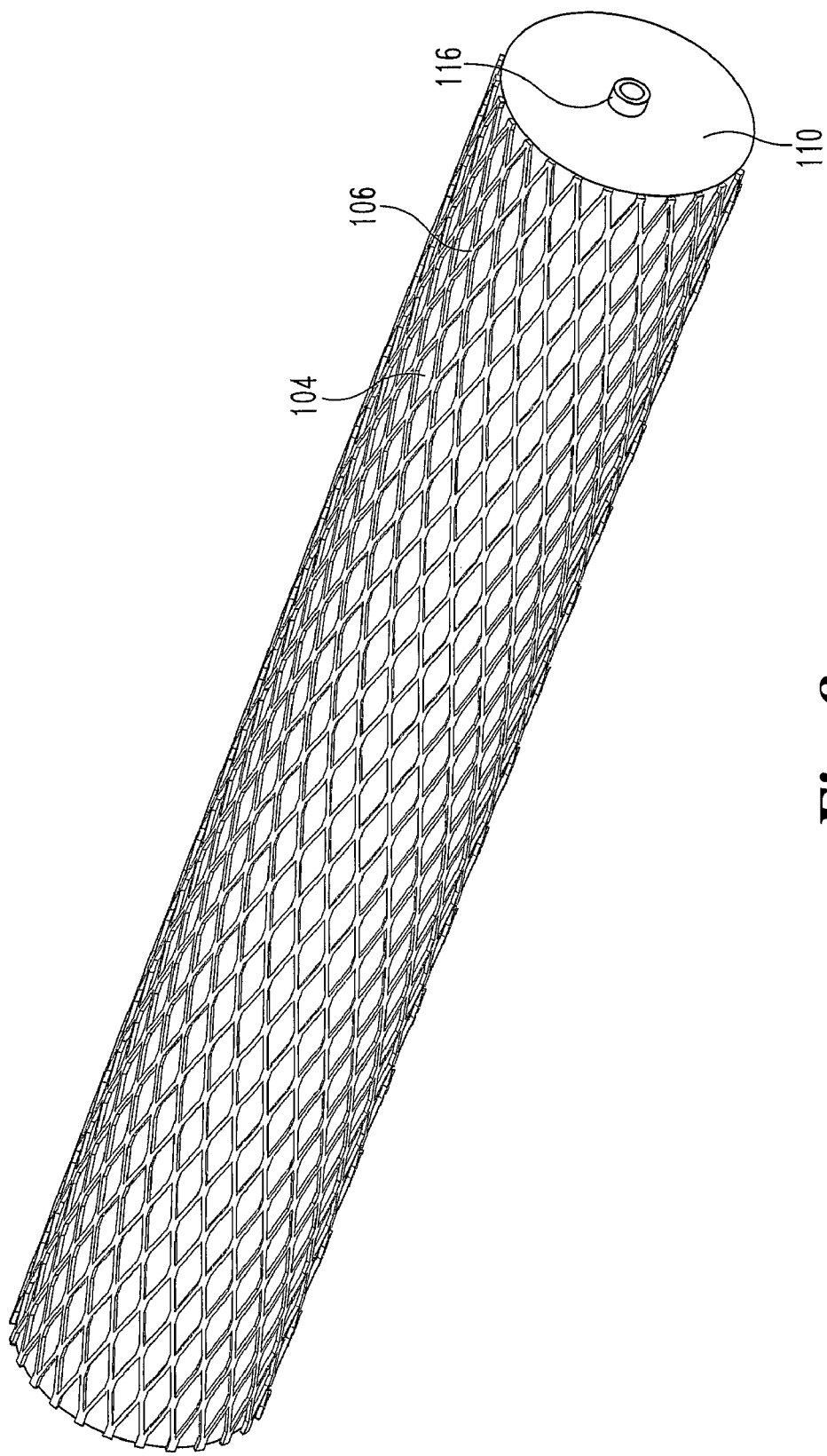
FIG. 8 is an enlarged perspective view of the roller.
Figure 9:
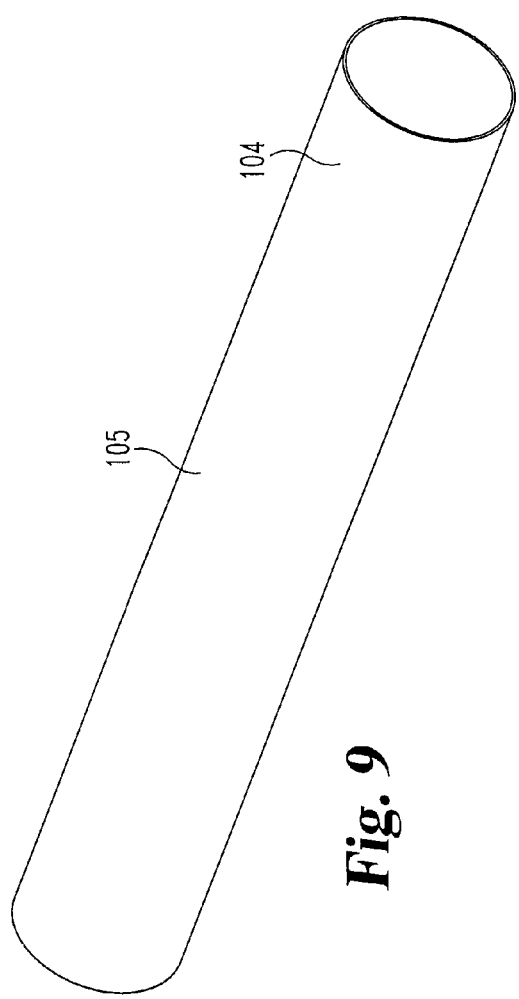
FIG. 9 is a perspective view of the interior cylinder of the roller.
Figure 10:
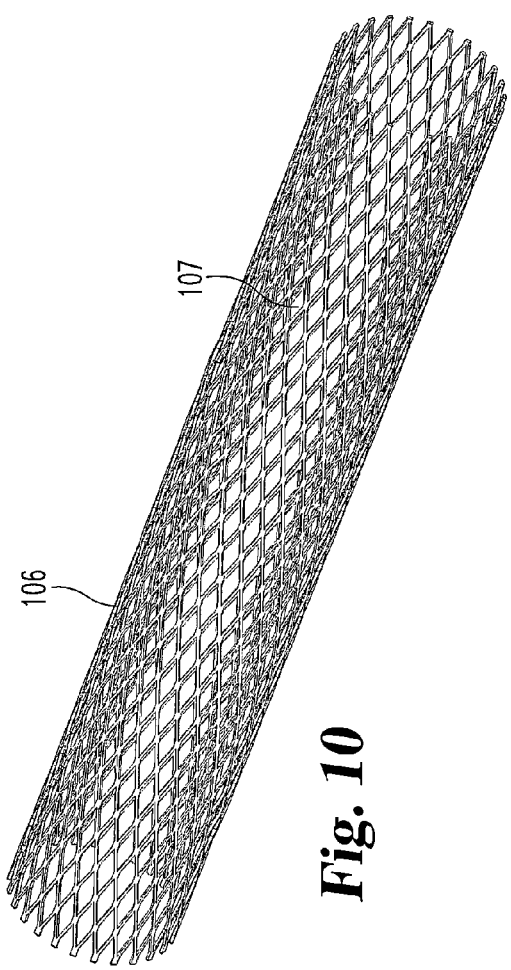
FIG. 10 is a perspective view of the perforated wall surrounding the roller.

Roller assembly 31 (FIGS. 1 and 2) has a cylindrical main body rotatably mounted at its opposite ends by a pair of parallel arms 100 having ends 102 pivotally mounted by conventional fasteners 103 to respectively the side walls 22 and 23. The roller assembly includes a hollow cylindrical body 104 (FIG. 9) having an outwardly facing and continuous solid surface 105. A cylindrical perforated wall 106 (FIG. 10) extends around main body 104 and is secured together by welding or other suitable means. Outer wall 106 is configured to include a plurality of holes 107 extending therethrough forming a mesh covering extending continuously around surface 105. Thus, as the roller is in contact with the ground, the soil, dirt and other material may flow through openings 107 but are stopped from penetrating the roller by the outwardly facing surface 105. Most importantly, if the relatively weak wall 106 encounters a rigid object, such as a stone, surface 105 provides a backup stop surface limiting inward movement of wall 106 thereby preventing damage to the perforated wall. A pair of end plates 110 (FIG. 8) are mounted to the opposite ends of the combination of main body 104 and wall 106. The resulting roller is rotatably mounted by axle 116 about an axis of rotation to the ends 112 of parallel arms 100.

A pair of plates 120 and 121 (FIG. 2) are fixedly mounted in cantilevered fashion to wall 22 and a second set of plates 120 and 121 are fixedly mounted also in cantilevered fashion to wall 23. When the roller 31 is positioned in the upward storage position (FIG. 1), arms 100 rest against plates 121 with a standard fastener 123 extending through plate 121 and into arm 100 locking the roller in the upward position. When the roller is to be used to pulverize and level the ground, the roller is swung downward with arms 100 resting against plates 120 (FIG. 2) with the same fastener 123 then being used to extend through plate 120 and into arm 100 locking the roller in the downward position. In the event fasteners 123 are removed while the roller is in the downward position, then the roller is in a floating downward position and rides across the ground moving with the ground contour.

Handles 130 (FIGS. 1 and 2) are fixedly mounted to the end of arms 100 adjacent the roller to enable the user to grasp and raise or lower the pivoting arms 100. In the drawings, the handle is a C-shaped rod with the two distal ends of the rod main body welded to the arms.

Tine assembly 60 (FIG. 4) includes a rigid member 140 having its opposite ends fixedly attached to ends of rigid end brackets 141 and 142. The opposite ends 143 of bracket 141 and 142 are pivotally mounted respectively to the side walls 23 and 22 of the turf grader. Pairs of spring tines are fixedly mounted to rigid member 140 and extend around a rod 144 having its opposite ends mounted to end plates 141 and 142.

Figure 4:
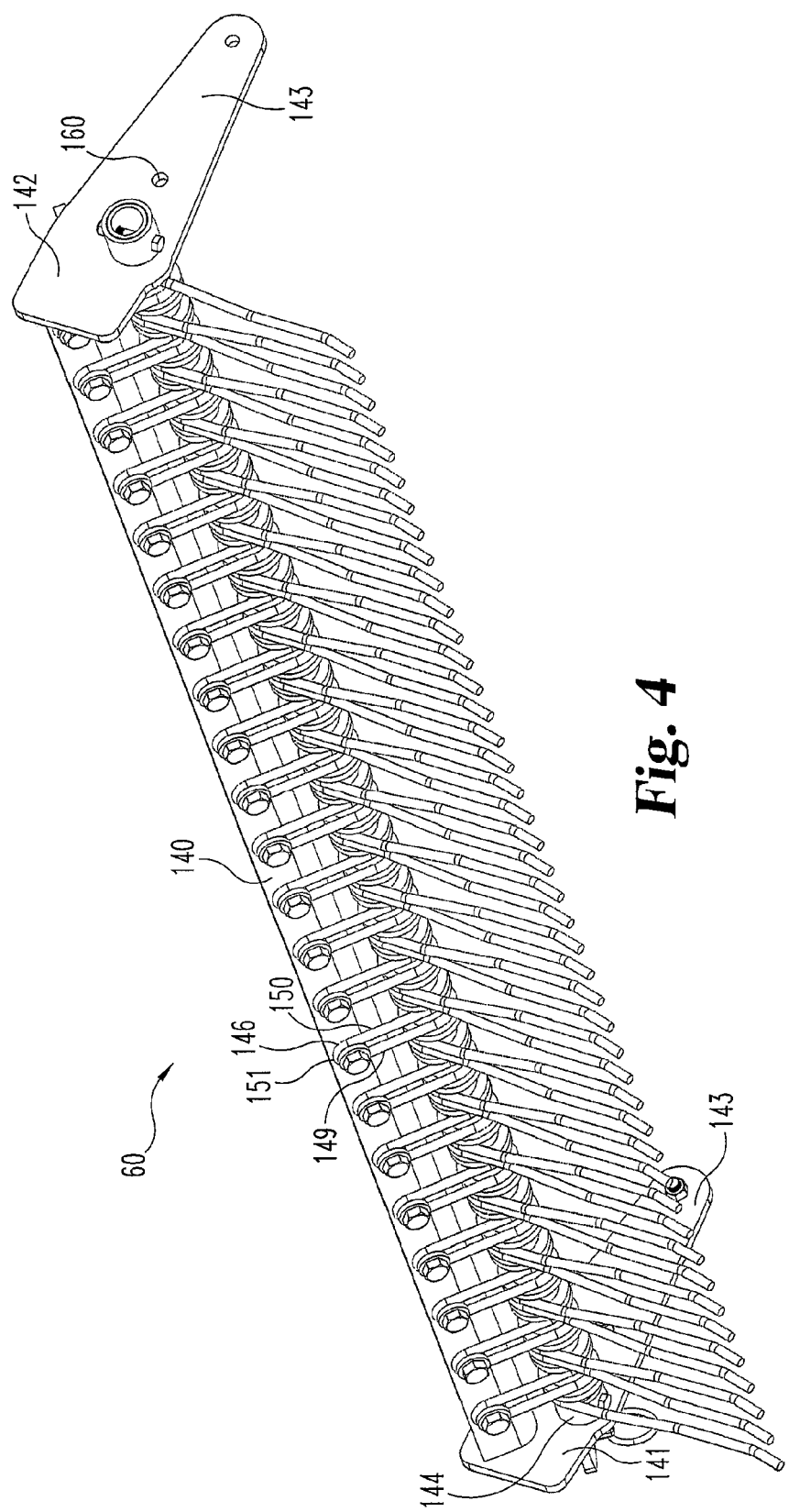
FIG. 4 is a perspective view of the tine assembly.
Figure 6:
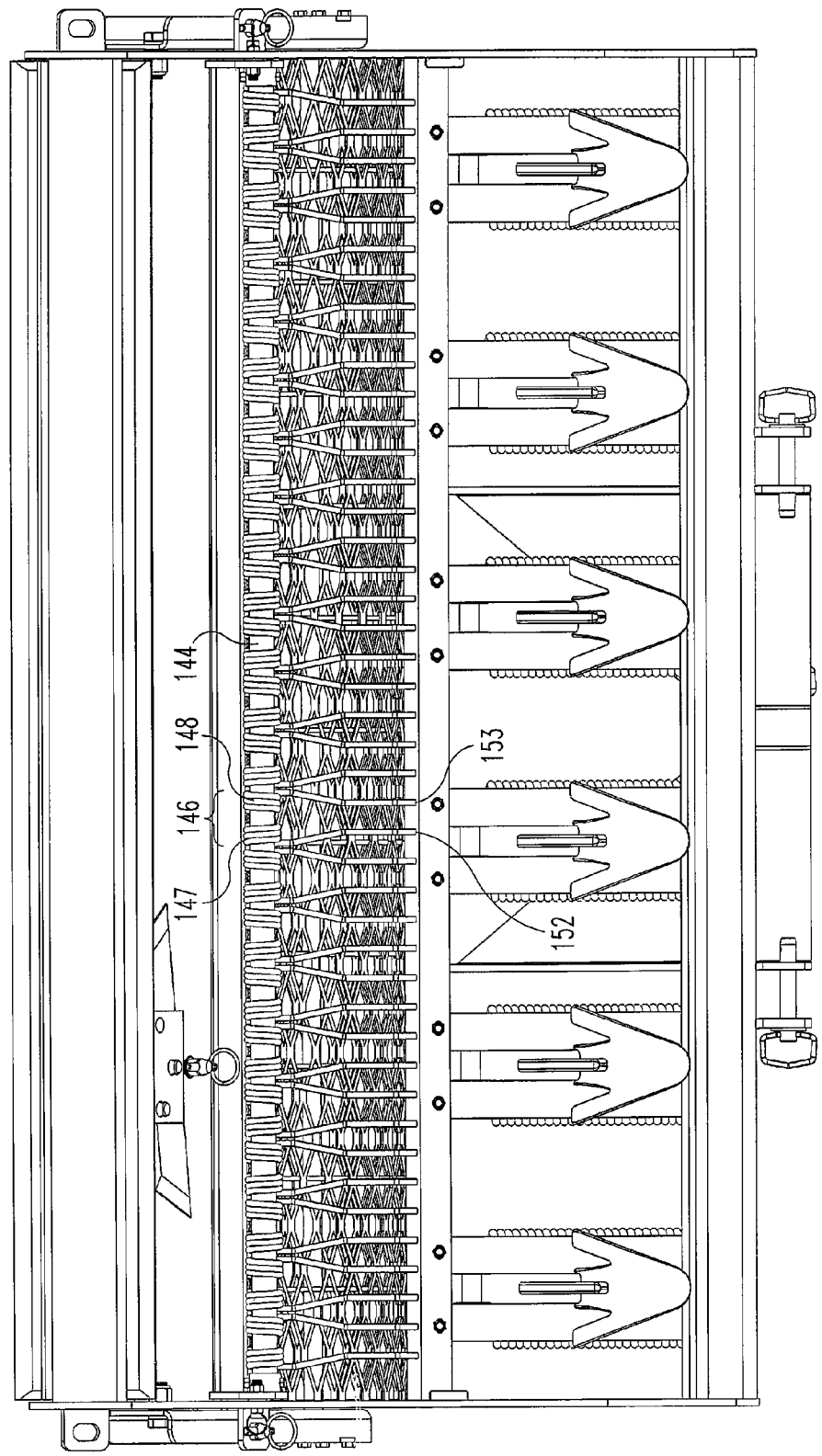
FIG. 6 is a bottom view of the turf grader.

Twenty-two pairs of tines are shown in FIG. 4 mounted to member 140 and rod 144, it being understood that the present invention includes pairs of tines greater than or less than twenty-two pairs. Pair 146 will now be described it being understood that an identical description applies to the remaining pairs. Pair 146 has a wire main body consisting of two spaced apart helical wound coils 147 and 148 (FIG. 6) through which rod 144 extends. One end of coil 147 extends from rod 144 to member 140 forming straight portion 149. Likewise, one end of coil 148 extends from rod 144 to member 140 forming straight portion 150 with straight portions 149 and 150 then being integrally joined together and wrapped around a conventional fastening device 151 fixedly secured to member 140 thereby fixedly mounting the two coils to member 140. The opposite ends of the coils extend downwardly to the ground. One end of coil 147 extends downwardly to distal end 152 whereas one end of coil 148 extends downwardly to distal end 153. Distal ends 152 and 153 contact the soil when the tine assembly is in the lowered position.

Figure 5:
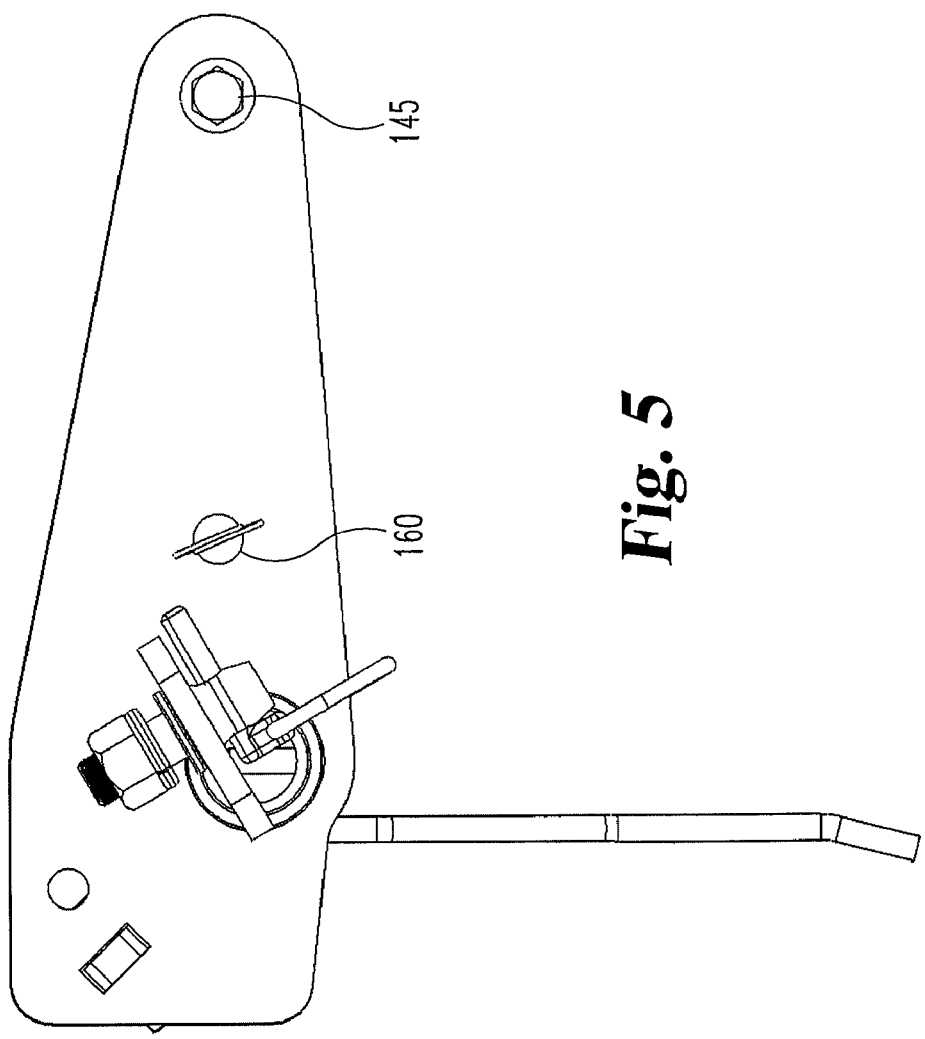
FIG. 5 is an enlarged right end view of the tine assembly of FIG. 4.

Tine assembly 60 has a sub-frame comprising end plates 141 and 142 along with member 140 and rod 144 with the pairs of tines mounted thereto. The sub-frame is pivotally mounted by fasteners 145 (FIG. 5) to side walls 22 and 23 allowing the tine assembly to be pivoted in a clockwise direction from the downward position as viewed in FIG. 5 to an upward stored position (FIG. 7) where the tines do not engage the soil and are positioned at a maximum distance from the ground. Holes 160 (FIG. 4) are provided in end plates 141 and 142 and are alignable with holes provided in side walls 22 and 23 of the turf grader main frame enabling fasteners to be extended through the holes of the main frame side walls and into end plates 141 and 142 to secure the tine assembly either in the upward stored position or the downward engaged position. Most importantly, each pair of tines is an integral unit. Thus, the downwardly extending legs terminating at the distal ends 152 and 153 are integrally joined to the two coils 147 and 148 which, in turn, are integrally joined together by the straight portions 149 and 150.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A turf grader comprising:
   a plurality of plow blades to plow the ground;
   a main frame having said plow blades mounted thereto which extend downwardly, said main frame having a vehicle receiving mount for attachment to move the main frame across the ground;
   a first scraper blade assembly with a first scraper blade pivotally mounted on said frame having a first position to scrape the ground as said main frame is moved across ground and a second position located apart from the ground;
   a tine assembly movably mounted to said frame and located between said plow blades and said scraper blade to catch debris from the ground plowed by said plow blades, said tine assembly having tines integrally connected together in separate pairs with said pairs each having a spring integrally connecting the tines of each pair together, each spring normally biasing said pair of tines toward the ground but yieldable to allow said pair of tines to move upwardly therefrom; and,
   a roller frame pivotally mounted to said main frame and having a leveling and pulverizing roller rotatably mounted about an axis of rotation to said roller frame, said roller extending widthwise across said main frame and having a main cylindrical body with an outwardly facing solid surface that extends continuously around said axis of rotation, said roller further has an outer cylindrical mesh wall located outwardly of said outwardly facing surface of said main cylindrical body extending around said axis of rotation, said cylindrical mesh wall has openings extending therethrough to allow dirt to move into said openings with said outer facing surface of said main cylindrical body forming a stop surface limiting movement of said dirt and providing a back-up surface limiting inward movement of said mesh wall limiting damage thereto by external objects.

2. The turf grader of claim 1 wherein:
   said tine assembly includes a sub-frame movably mounted to said main frame and further includes a rod with opposite ends mounted to said sub-frame with said pairs of tines mounted thereon, said rod extends widthwise across said main frame, said sub-frame movable from an in-use position to a stored position whereat when in said second position said tines are positioned at a maximum distance from said ground.

3. The turf grader of claim 2 wherein:
   said spring of each of said pairs of tines wraps around said rod and is affixed to said sub-frame to move therewith, said tine assembly includes a pair of removable pins extendable from outwardly of said frame and through said frame into said sub-frame holding said sub-frame in either said in-use position or said stored position.

4. The turf grader of claim 3 wherein:
   said first scraper blade assembly includes a fastener to hold said scraper in said second position but removable to allow said scraper blade to contact the ground.

5. The turf grader of claim 4 and further comprising:
   a second blade pivotally mounted to said main frame contacting the ground and leveling same, said first blade located between said second blade and said plow blades.

6. The turf grader of claim 1 wherein:
   said roller frame has a pair of parallel arms with inner ends pivotally mounted to said main frame and outer ends with said roller rotatably mounted thereto, said roller frame including a handle on at least one of said arms for grasping and pulling to pivot said roller frame about said inner ends.

7. A turf grader comprising:
   a plurality of plow blades to plow the ground;
   a main frame having said plow blades mounted thereto which extend downwardly, said main frame having a vehicle receiving mount for attachment to move the main frame across the ground;
   a first scraper blade assembly with a first scraper blade pivotally mounted on said frame having a first position to scrape the ground as said main frame is moved across ground and a second position located apart from the ground;

a tine assembly movably mounted to said frame and located between said plow blades and said scraper blade to catch debris from the ground plowed by said plow blades, said tine assembly having tines, at least some of which are integrally connected together, and springs with said springs normally biasing said tines toward the ground but yieldable to allow said tines to move upwardly therefrom; and, a roller frame pivotally mounted to said main frame and having a leveling and pulverizing roller rotatably mounted about an axis of rotation to said roller frame, said roller extending widthwise across said main frame and having a main cylindrical body with an outwardly facing solid surface that extends continuously around said axis of rotation, said roller further having an outer cylindrical mesh wall separate from but on said outwardly facing surface of said main cylindrical body extending around said axis of rotation, said cylindrical mesh wall having openings extending therethrough to allow dirt to move into said openings with said outer facing surface of said main cylindrical body forming a stop surface limiting movement of said dirt and providing a back-up surface limiting inward movement of said mesh wall limiting damage thereto by external objects.

8. The turf grader of claim 7 wherein:

said roller frame has a pair of parallel arms with inner ends pivotally mounted to said main frame and outer ends with said roller rotatably mounted thereto, said roller frame including a handle on at least one of said arms for grasping and pulling to pivot said roller frame about said inner ends.

9. The turf grader of claim 8 wherein:

said first scraper blade assembly includes a fastener to hold said scraper blade in said second position but removable to allow said scraper blade to contact the ground.

10. The turf grader of claim 9 and further comprising:

a second blade mounted to said main frame contacting the ground and leveling same, said first blade located between said second blade and said plow blades.

11. A turf grader comprising:

a plurality of plow blades to plow the ground;

a main frame having said plow blades mounted thereto which extend downwardly;

a tine assembly movably mounted to said frame to catch debris from the ground plowed by said plow blades, said tine assembly having pairs of tines with the tines of a pair integrally connected together and springs with said springs normally biasing said tines toward the ground but yieldable to allow said tines to move upwardly therefrom; and, a roller frame pivotally mounted to said main frame and having a leveling and pulverizing roller rotatably mounted about an axis of rotation to said roller frame, said roller extending widthwise across said main frame and having a main cylindrical body with an outwardly facing solid surface that extends continuously around said axis of rotation, said roller further having an outer cylindrical mesh wall on said outwardly facing surface of said main cylindrical body extending around said axis of rotation, said cylindrical mesh wall having openings extending therethrough to allow dirt to move into said openings with said outer facing surface of said main cylindrical body forming a stop surface limiting movement of said dirt into said roller and providing a back-up surface limiting inwardly movement of said mesh wall limiting damage thereto by external objects.

12. The turf grader of claim 11 wherein:

said roller frame has a pair of parallel arms with inner ends pivotally mounted to said main frame and outer ends with said roller rotatably mounted thereto, said roller frame including a handle on at least one of said arms for grasping and pulling to pivot said roller frame about said inner ends.

13. The turf grader of claim 11 wherein:

said tine assembly includes a sub-frame movably mounted to said main frame and further includes a rod with opposite ends mounted to said sub-frame with said pairs of tines mounted thereon, said rod extends widthwise across said main frame, said sub-frame movable from a first position to a second position whereat when in said second position said tines are positioned apart from said ground.

14. The turf grader of claim 13 wherein:

said springs of said pair of tines wrap around said rod and are affixed to said sub-frame to move therewith, said tine assembly includes fasteners extendable from outwardly of said frame and through said frame into said sub-frame holding said sub-frame in either said first position or said second position depending upon the position of said sub-frame.

* * * * *